Sept. 15, 1964           W. T. ABEL ETAL                3,149,006
                 PREVENTION OF EMBRITTLEMENT OF METALS
Filed Jan. 31, 1963                                2 Sheets-Sheet 2
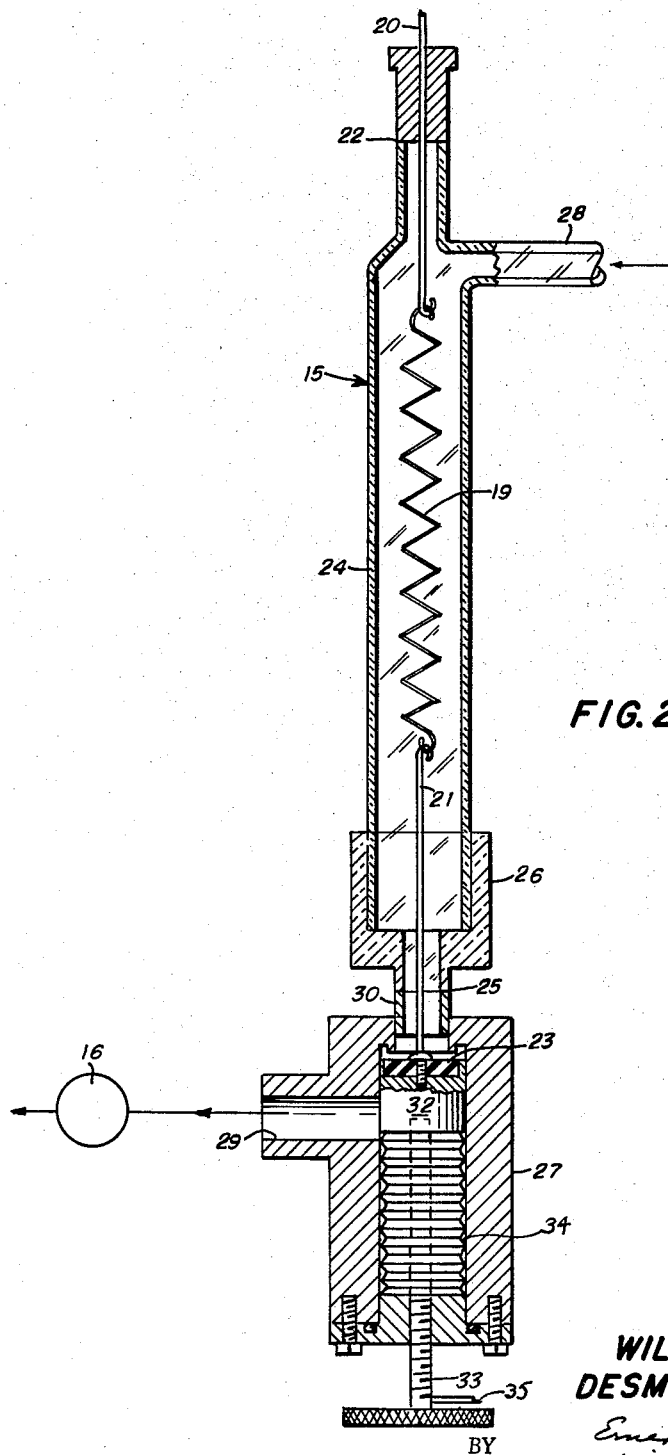
INVENTORS
**WILLIAM T. ABEL
DESMOND M. BAILEY**
BY
ATTORNEYS 3,149,006
PREVENTION OF EMBRITTLEMENT OF METALS
William T. Abel, Morgantown, W. Va., and Desmond M. Bailey, Memphis, Tenn., assignors to the United States of America as represented by the Secretary of the Interior
Filed Jan. 31, 1963, Ser. No. 255,413
14 Claims. (Cl. 148—16)
(Granted under Title 35, U.S. Code (1952), sec. 266)

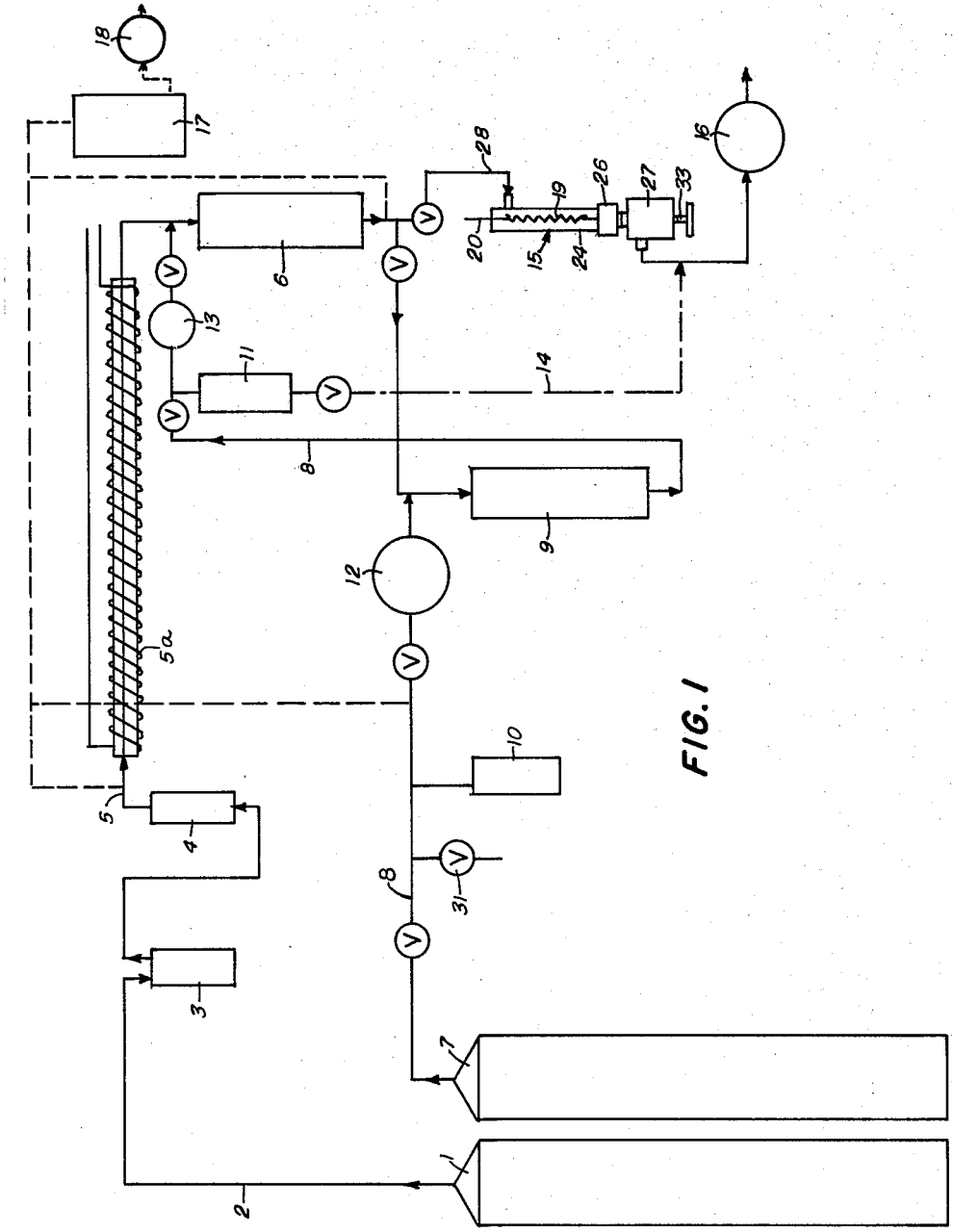

The invention herein described and claimed may be manufactured and used by or for the Government of the United States of America for governmental purposes without the payment of royalties thereon or therefor.

This invention is concerned with a method for prevention of embrittlement of metals.

Many industrial processes involve the use of metals at high temperature in inert atmospheres. Examples of such processes are operation of gas-cooled nuclear reactors, welding, metal fabrication and refining and metal processing operations and chemical synthesis in protective inert atmospheres. In such operations embrittlement of the metals is often a serious problem since it may result in adverse changes in the physical properties of the metals, sometimes making them totally unsuitable for their intended use.

It has now been found that embrittlement of metals in inert atmosphere at elevated temperature may be prevented by addition to the inert atmosphere of an oxidizing gas such as $O_2$, $CO_2$ or $H_2O$. Though embrittlement is prevented by the addition of the oxidizing gas, the gas itself may have an adverse effect in some cases due to the tendency of the gas to oxidize the metal. For example, in the case of tungsten filament at high temperature in an atmosphere of helium, addition of oxygen is effective in prevention of embrittlement but results in loss in weight of the filament due to formation of volatile tungsten oxides. It has been found that the addition of hydrogen gas to the inert gas-oxidizing gas atmosphere is very effective in preventing oxidation of the metal while at the same time having no adverse effect on the capacity of the oxidizing gas to prevent embrittlement.

FIG. 1 is a schematic illustration of the apparatus employed in the examples.

FIG. 2 is a schematic sectional view of the filament tube element 15 in FIG. 1.

Tank 1 contains the inert gas and connects via line 2 (⅜" O.D. metallic tubing) to water vapor trap 3 and purification tower 4 (tantalum foil at 900° F.) which in turn connects to mixing tower 6 and filament tube assembly 15 via line 5 (stainless steel tubing heated to 300° F.). Line 5 is heated by means of a coil of resistance wire 5a wound around the tubing. The wire is electrically insulated from the tubing and a layer of heat insulation covers the tubing and heating wire. Heating is controlled by the amount of current passed through the resistance wire coil. Tank 7 contains the impurities (oxidizing gas or hydrogen) and connects via line 8 (⅜" O.D. metallic tubing) to storage bottle 10, gas flow meter 12, mixing tower 9, storage bottle 11 and gas flow meter (orifice meter) 13. Filament tube assembly 15 connects via ⅜" O.D. metallic tubing to gas flow meter 16. The system is evacuated by means of oil diffusion pump 17 and mechanical vacuum pump 18. Auxiliary flushing line 14 (⅜" O.D. metallic tubing) connects storage bottle 11 with gas flow meter 16.

A known mixture of pure inert gas and an impurity gas is accomplished by admixing a flow of impurity gas, measured by flow meter 12, into a known flow of inert gas at the entrance to mixing tower 6. The inert gas flow is measured by establishing the flow rate through gas flow meter 16 before the admixture is made. If a mixture of very low impurity content is desired, two dilutions may be required. In this case the first admixing would be accomplished at the entrance to mixing tower 9, and a portion of the mixture caught in storage bottle 11. The mixture is then fed into a stream of pure inert gas at the entrance to mixing tower 6. From mixing tower 6 the gases pass to the filament tube assembly and then to gas flow meter 16.

Mixing towers 6 and 9 are stainless steel cylinders, about 2 inches O.D. and 18 inches long with walls about 1/16" thick. Flow lines are welded to the center of each end plate. The cylinders contained no packing because of the problem of outgassing. Auxiliary flushing line 14, consisting of ⅜ inch O.D. copper tubing, allows flushing storage bottle 11 before collecting a portion of the gas mixture. Valve 31 provides an opening to the atmosphere for the purpose of relieving pressure on this part of the system.

FIG. 2 illustrates the details of filament tube assembly 15. Tungsten filament 19 is supported by means of electrical lead wires 20 and 21 which are secured to the cap of the metal-to-glass Kovar fitting 22 and the movable valve seat 23. The filament is enclosed in ⅞" I.D. Pyrex tube 24, the lower end of which is a male ground glass joint which fits into the female ground glass joint 26. Joint 26 is mounted in high vacuum bellows sealed valve 27 by means of a glass-to-metal Kovar seal 25. The test gas mixture enters via connection 28 and is exhausted through outlet 29.

Kovar fitting 22 (made by Corning Glass Company) consists of a Pyrex glass tube sealed to a copper tube, the latter being at the upper end of the fitting. Electrical lead wire 20 is welded into a cap over the metal end of the tube.

Another Kovar fitting 25 joins ground glass joint 26 and copper tubing 30 which is welded into bellows-sealed valve 27.

The high vacuum bellows sealed valve 27, comprising valve 32, valve stem 33, seat 23, flexible copper seal 34 (soldered at both ends) and electrical lead wire 35, provides a gas-tight seal between the atmosphere side of the valve stem and the seat side of the valve stem by means of flexible seal 34 that moves in and out with the valve stem. It is a full-opening valve so that no restrictions are introduced by the valve.

The function of the valve is to provide an easy way of adjusting tension on the tungsten filament while the system is closed. Filament support rod 21 is attached to the valve; as the valve is opened the support rod moves down, thereby stretching the filament and establishing good electrical contact between filament and support rods.

The following examples will serve to more particularly describe the invention.

EXAMPLE I

The water vapor trap (reference 3 in FIG. 1) in this example consisted of a liquid nitrogen trap which served to freeze out any water vapor from the inert gas stream. Impurities such as $O_2$, $CO_2$ and CO were removed from the inert gas stream by means of the purification tower in which the impurities form oxides and carbides with the tantalum at elevated temperature.

The gas flow meter (reference 12 of FIG. 1) comprised a pair of orifice meters arranged in parallel so that either could be used depending on the flow desired, and consisted of disks of copper soldered in a copper tube. The gas flow passed through a small hole in the metal disk at a rate depending on the pressure difference between the upstream and downstream side of the metal disk. This pressure difference was measured by a draft gage or manometer connected between the upstream and downstream sides of the metal disk or orifice plate. Each orifice was calibrated to relate the flow rate with pressure difference.

The filament was a spiral of tungsten wire 15⅜ inches in length and 0.02 inch diameter, formed by wrapping twelve turns on a grooved dowel of ⅜ inch diameter. It was heated by means of an electrical current and the temperature measured with an optical pyrometer. The electrical supply was 115 v. A.C. stepped down to 40 v. A.C. with a transformer and supplied to the filament by a variable powerstat.

The system was initially evacuated and flushed with the inert gas to clear impurities, then flow of the gaseous media was established at a measured rate. Current was supplied to the filament at a rate sufficient to heat it to the desired temperature. After the desired exposure time, the current was switched off and the filament allowed to cool in place for about two minutes after which it was removed for weighing and examination. Embrittlement of the filament was determined by a flexing test performed by hand. If the filament could be flexed enough to deform the spiral without breaking the filament wire the condition was described as pliable. If it was shattered when flexed the condition was described as brittle.

It will be seen that the filament was brittle after treatment in essentially pure helium. After treatment in helium containing small amounts of oxygen the filament was pliable though with an increased loss in weight of the filament. When hydrogen is added the loss in weight becomes negligible and the filament remains pliable after treatment.

The helium employed in the tests was Grade A and had the following cylinder analysis:

| Impurity: | P.p.m. |
|---|---|
| $H_2$ | 0 |
| $H_2O$ | 2 |
| Neon | 14 |
| $N_2$ | 1–10 |
| O | 0–5 |
| Argon | 0 |
| $CO_2$ | 0 |

The oxygen employed was research or extra dry grade of 99.6 percent minimum purity corresponding to 4000 p.p.m. maximum total impurity.

The hydrogen was electrolytic grade of 99.8 percent minimum purity corresponding to 2000 p.p.m. maximum total impurity.

Though oxygen is used as the oxidizing gas in the example, the invention is not limited thereto and other

*Table I*

| Atmosphere | Concentration of impurities, p.p.m. | Filament Temp., °F. | Time of filament exposure, minutes | Loss in weight of filament, gm. | Condition of filament |
|---|---|---|---|---|---|
| Vacuum, pressure less than 0.1 mm | | 2,700 | 15 | None | Brittle. |
| Helium: | | | | | |
| Test 1 | | 3,152 | 15 | 0.00076 | Do. |
| Test 2 | | 3,150 | 15 | 0.00052 | Do. |
| Test 3 | | 2,850 | 15 | 0.00041 | Do. |
| Test 4 | | 2,640 | 15 | 0.00031 | Do. |
| Test 5 | | 2,980 | 15 | 0.00040 | Do. |
| Helium containing oxidizing impurity: | | | | | |
| Test 6 | 161 Oxygen | 2,500 | 15 | 0.00382 | Pliable. |
| Test 7 | 236 Oxygen | 2,500 | 15 | 0.00631 | Do. |
| Test 8 | 130 Oxygen | 3,200 | 15 | 0.00470 | Do. |
| Test 9 | 239 Oxygen | 3,200 | 15 | 0.01051 | Do. |
| Helium containing oxidizing impurities plus hydrogen: | | | | | |
| Test 10 | Up to 50 $CO_2$ / Up to 1,000 $N_2$ / 200–250 $O_2$ / 15,000 $H_2$ | 2,700 | 15 | None | Do. |
| Test 11 Repeat using same materials. | | 2,700 | 15 | 0.00001 | Do. |

Runs were made using helium alone and helium-containing oxygen as the oxidizing gas. The results are shown in table I.

EXAMPLE II

In this example the water vapor trap consisted of a chamber containing $P_2O_5$ and activated alumina rather than the liquid nitrogen trap used in Example I. Furthermore, the tantalum purification tower was omitted since the purity of the helium made its use unnecessary.

The gas flow meter (12) also differed from that employed in Example I, rotameters being employed in place of the orifice meters of Example I.

The source of oxygen was bled from the outside atmosphere into the sytem via line 31 in FIG. 1. The amount of oxygen was determined from previous tests in the system relating filament weight loss to oxygen concentration where oxygen was injected, i.e., in the previous trial where only helium and the in-leaking impurities were the atmosphere around the hot filament, the filament weight loss indicated an oxidizing concentration from a minimum of 200 p.p.m. to a maximum of 250 p.p.m. As indicated in table I, traces of $CO_2$ and $N_2$ may also have been present but had no effect on the oxidizing action of the oxygen.

Results are again shown in table I.

oxidizing gases such as $CO_2$ or steam may be employed with comparable advantageous results.

The method of the invention is also applicable to other metals which are embrittled by high temperature treatment in inert atmospheres.

Although the exact mechanism involved in prevention of embrittlement by the oxidizing gases is not known, it is believed that the gases react at the hot metal surface and the oxides formed immediately sublime or are reduced if a sufficient excess of hydrogen is present. This surface reaction suppresses reactions or other phenomena that cause embrittlement or prevents embrittlement by its own action. Accordingly, the method of the invention is particularly applicable to metals which form oxides that sublime well below the melting temperature of the metal, e.g., molybdenum, tantalum and certain alloy steels containing these metals, as well as tungsten.

The invention is also applicable to treatment of metals in inert gases such as nitrogen, argon, neon, and others of this class.

The method of the invention may also be varied as to other aspects without departing from the essential spirit and scope of the invention. For example, the physical form and use of the metal, the enclosure containing the inert gas and metal and the source of the inert and other gases may all vary widely. The inert gas atmosphere may be static rather than a flow of gas as employed in the examples. Furthermore, the apparatus employed may vary widely depending on the particular type of operation, conditions of temperature and pressure, source of gas (the gases employed may all be supplied by separate tanks or other containers or all may be combined in a single container for feeding to the system), etc.

What is claimed is:

1. A method for prevention of embrittlement of a metal from the group consisting of tungsten, molybdenum, tantalum and alloy steels containing these metals in an inert atmosphere at elevated temperature comprising adding to said inert atmosphere a small but effective amount of an oxidizing gas up to about 250 p.p.m. to prevent embrittlement of the metal.

2. Method of claim 1 in which the oxidizing gas is selected from the group consisting of oxygen, carbon dioxide, water and mixtures thereof.

3. Method of claim 2 in which the oxidizing gas is oxygen.

4. Method of claim 1 in which the metal is tungsten.

5. Method of claim 4 in which the tungsten is in the form of a filament.

6. Method of claim 1 in which the inert atmosphere is an inert gas.

7. Method of claim 6 in which the inert gas is helium.

8. A method for prevention of embrittlement of a metal from the group consisting of tungsten, molybdenum, tantalum and alloy steels containing these metals in an inert atmosphere at elevated temperature comprising adding to said inert atmosphere (1) a small but effective amount of an oxidizing gas up to about 250 p.p.m. to prevent embrittlement of the metal and (2) hydrogen gas in an amount sufficient to prevent oxidation of the metal by the oxidizing gas.

9. Method of claim 8 in which the oxidizing gas is selected from the group consisting of oxygen, carbon dioxide, water and mixtures thereof.

10. Method of claim 9 in which the oxidizing gas is oxygen.

11. Method of claim 8 in which the metal is tungsten.

12. Method of claim 11 in which the tungsten is in the form of a filament.

13. Method of claim 8 in which the inert atmosphere is an inert gas.

14. Method of claim 13 in which the inert gas is helium.

References Cited in the file of this patent

UNITED STATES PATENTS

| | | |
|---|---|---|
| 2,183,972 | Ramage | Dec. 19, 1939 |
| 2,284,288 | Laise | May 26, 1942 |
| 2,723,926 | Bellott | Nov. 15, 1955 |
| 2,875,113 | Fitz | Feb. 24, 1959 |